United States Patent Office

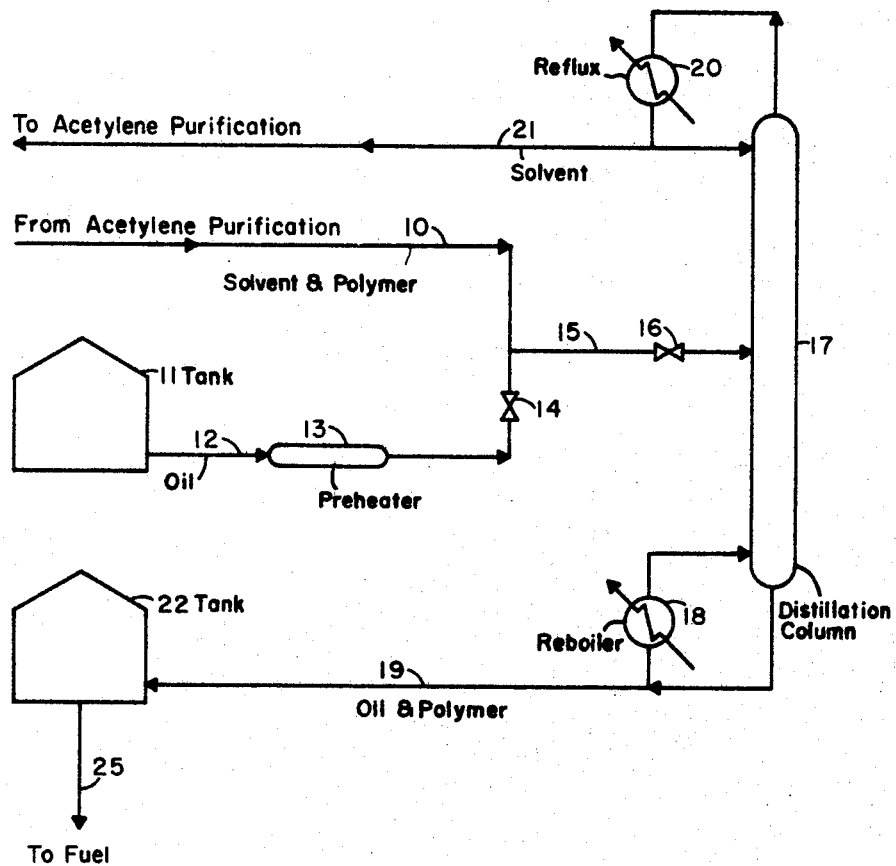

3,436,318
Patented Apr. 1, 1969

---

3,436,318
SOLVENT PURIFICATION BY DISTILLATION WITH A HYDROCARBON OIL
John Arnold Glass, Texas City, Tex., assignor to Monsanto Company, St. Louis, Mo., a corporation of Delaware
Filed Oct. 25, 1967, Ser. No. 677,942
Int. Cl. B01d 5/00
U.S. Cl. 203—52     5 Claims

ABSTRACT OF THE DISCLOSURE

A process for purification of solvents used for the purification of acetylene by absorption and which contain acetylenic polymers which comprises adding to said solvent a miscible hydrocarbon oil in an amount of from 1 to 15% by weight of the combined weight of solvent and oil and separating the solvent from the oil-solvent mixture by distillation.

---

BACKGROUND OF THE INVENTION

The present invention relates to an improvement in the process for purification or concentration of acetylene by selective solvent action. More particularly, it relates to the removal of polymeric material from an acetylene solvent.

As is known, acetylene may be produced by thermal treatment of hydrocarbons by various methods such as controlled pyrolysis, passage through an electric arc, partial combustion, and the like. In all such methods, acetylene represents only a relatively small percentage of the reaction product, which consists, depending upon the particular process employed, of a gaseous mixture usually containing, in addition to acetylene, hydrogen, carbon monoxide, carbon dioxide, methane, ethylene, and higher acetylenes. The concentration and/or separation of the acetylene is usually accomplished by the use of a suitable selective solvent.

A number of processes for separating acetylene from gaseous hydrocarbon mixtures containing the same by use of a selective solvent are known and are the subject of many U.S. patents. In most of these, the gaseous hydrocarbon mixture is scrubbed with the liquid solvent under conditions of temperature and pressure such that preferential solution of acetylene contained in the mixture is effected while the other hydrocarbons remain essentially undissolved. The acetylene-rich solvent is then stripped of the dissolved gas by reduction of pressure or application of heat or both to obtain a gas considerably richer in acetylene than was the original feed. The solvent is then returned to the absorption cycle for reuse in contacting fresh gas feed thus making possible a continuous process in which it should be possible to employ the solvent for an indefinite period of time.

In actual practice, however, considerable difficulty is experienced in many of such absorption processes because of the formation and buildup of polymeric material in the solvent. The polymeric material results from the polymerization of higher acetylenes such as di- and tri-acetylene present in the reaction product. Such polymers seriously impair the efficiency of the solvent and eventually cause plugging in the equipment which in turn necessitates periodic shut-down of the process for cleanup of the system. This results in significant production cutbacks as well as much expensive maintenance and calls for the use of excessive amounts of solvent. Attempts to separate these polymers from the solution by conventional means such as centrifugal filtration have not been completely successful because of the extremely small size of the particles of suspended polymer. Nor has distillation of the solvent-polymer mixture proved to be successful because of the tendency of the polymer to hold the solvent. This, of course, results in a very costly loss of solvent in the "polymer buttoms."

SUMMARY

It is therefore an object of the present invention to provide an improved process for the purification or concentration of acetylene.

It is a further object of the invention to provide an improved process for the purification or concentration of acetylene by means of selective solvent techniques.

A still further object of the invention is to provide an extremely effective method for the removal of acetylenic polymers from solvents employed in the purification or concentration of acetylene.

Other objects and advantages of the invention will be apparent from the following description of the invention, the drawing and the appended claims.

Basically the process of the present invention comprises admixing the polymer-laden solvent with a minor amount of a miscible, inert oil having an initial boiling point of at least 125° C. higher than the boiling point of the solvent, subjecting said admixture to distillation at a temperature sufficient to vaporize the solvent and recovering the solvent substantially free of polymer and oil.

DECRIPTION OF THE DRAWING

The figure is a schematic diagram of suitable apparatus in which the instant process may be performed.

DESCRIPTION OF THE PREFERRED EMBODIMENTS

The process of the present invention is illustrated by the following example which is not to be construed as a limitation on the scope thereof.

Example

A series of runs were made in which several feed samples were distilled under various conditions and the purified solvent collected. The feed samples were prepared by mixing measured amounts of a working solution of N-methyl pyrrolidone, a well known acetylene solvent, containing from about 1 to 4% by weight of a brownish polymeric material which had formed and accumulated over the period of time in which the solvent had been employed for the purification of acetylene and a hydrocarbon oil known as "flux oil." The "flux oil" consisted of a high-boiling distillation fraction from a hydrodealkylation feedstock. The oil was comprised primarily of $C_{13}$ and higher compounds and had an initial boiling point of 310° C. and a middle boiling point of 360° C. To carry out the distillations, a 2-in. Oldershaw column with a 5-tray section above the feed tray and a 10-tray section below was used. The column was fitted with a bottoms reboiler, a reflux condenser and a distillate receiver. The system was equipped with a vacuum pump so that reduced pressures could be employed in the column. The aforementioned mixtures of oil and working solvent were injected into the column at metered rates. In all cases, a reflux ratio of 1:7 was used and the column pressure was maintained at 100 millimeters. Analyses of the overhead materials were obtained by a mass spectrometric technique. The bottoms samples were analyzed by an infrared method. The conditions employed and the results obtained are presented in Table I. All compositions given in the table are in parts by weight unless otherwise indicated.

TABLE I

| Run No. | Feed rate, ml./min. | Bottoms temp., °C. | Overhead temp., °C. | Feed Composition NMP | Feed Composition Oil | Feed Color | Bottoms Composition NMP | Bottoms Composition Oil | Bottoms Color | Overhead Composition NMP | Overhead Composition Oil | Overhead Color |
|---|---|---|---|---|---|---|---|---|---|---|---|---|
| 1 | 17.6 | 235 | 134 | 9 | 1 | Dark brown | 0 | 10 | Black | 9.98 | 0.02 | Clear. |
| 2 | 17.6 | 179 | 134 | 9 | 1 | do | 2.5 | 7.5 | do | 9.99 | 0.01 | Do. |
| 3 | 17.6 | 201 | 134 | 9 | 1 | do | 0.45 | 9.45 | do | 9.98 | 0.02 | Do. |
| 4 | 17.6 | 224 | 134 | 9.1 | 0.9 | do | 0.01 | 9.99 | do | 9.97 | 0.03 | Do. |
| 5 | 21.8 | 226 | 133 | 9.1 | 0.9 | do | 0.01 | 9.99 | do | 9.96 | 0.04 | Do. |
| 6 | 38.5 | 226 | 134 | 9.1 | 0.9 | do | 0.05 | 9.95 | do | 9.95 | 0.05 | Do. |

As the composition data and a comparison of the color of the feed, overhead and bottoms clearly show, the instant process provides a simple and efficient method for purifying acetylene absorption solvents containing acetylenic polymers. It is also to be noted that very little loss of N-methyl pyrrolidone in the bottoms occurs; substantially all of the solvent being recovered as overhead.

The process of the present invention can be performed either in batch or continuous operation. Reference is now made to FIGURE 1 for a description of a continuous method of commercially practicing the process of the present invention. A suitable oil coming from tank 11 via line 12 and preheater 13 is added to a stream of polymer-laden solvent, i.e., working solvent coming from an acetylene purification system via line 10. Valve 14 controls the amount of oil being added to the working solvent stream. The combined oil and working solvent flow via line 15 and feed rate control valve 16 to an intermediate point in distillation column 17. Heat is supplied to column 17 by means of reboiler 18 located at the base thereof. Overhead vapors from column 17 comprising essentially solvent free of polymer and the oil are condensed and refluxed to column 17 by means of reflux condenser 20, while a portion of the condensed solvent is continuously removed via line 21 and returned for reuse in the acetylene purification system. Bottoms from column 17 comprised essentially of the oil and polymer are continuously withdrawn via line 19 and transferred to storage tank 22. The polymer-oil mixture in tank 22 can be removed via line 23 and used for fuel or like purposes.

In general, the oils suitable for use in the instant process should meet three criteria; they must be miscible with the acetylene solvent being purified, they must not react with the solvent under the process conditions and they should have an initial boiling point at least 125° C. higher than the boiling point of the acetylene solvent. One suitable group of oils can be derived from the naturally occurring fatty oils made up of mixed glycerides. Such oils are composed largely of fatty acid oils of glycerol. These oils may come from various sources, for example, whale oil and vegetable oils, and the like. The use of these oils is limited as a practical matter by their relatively high cost. A more convenient and less costly source of suitable oils is found in various hydrocarbon oils obtained as high boiling fractions from thermal cracking and hydrodealkylation processes which utilize petroleum feedstocks as the raw material, e.g., the usual oil refinery operation. A preferred oil of the hydrocarbon oil class known as "flux oil" can be obtained as a high boiling fraction from a hydrodealkylation feedstock. This oil is a heavy aromatic oil comprised primarily of $C_{13}$ and higher compounds and has an initial boiling point ranging from 300 to 340° C. and a middle boiling point ranging from 350 to 375° C.

Among the large number of acetylene solvents which can be purified by practice of the present invention are acetone, dimethylformamide, N-methyl pyrrolidone and butyrolactone. The process is particularly applicable to the purification of N-methyl pyrrolidone or butyrolactone.

The amount of oil added to the working solvent may vary from 1 to 15% by weight based on the final oil working solvent composition, with the preferred range being from 5 to 15% by weight. In general, the lower the polymer content of the solvent, the less the amount of oil that need be added. Since, however, the polymeric content of typical acetylene absorption solvents is usually from about 1 to 6% by weight, the above range of 5 to 15 weight percent oil in the oil-solvent mixture will generally be found to be the most useful.

The reflux ratios used in the distillation step can vary over relatively wide limits with a range of from 1:3 to 1:10 being especially preferred when the solvent being purified is N-methyl pyrrolidone or butyrolactone and the oil used is the aforementioned and described "flux oil."

Temperatures and pressures used in the distillation step of the present invention may also range over wide limits depending on the particular acetylene solvent being purified and the particular oil being used. As a general rule, however, reduced pressures are preferred so as to lower the temperature at which vaporization of the solvent occurs. In the preferred embodiments wherein the solvent is N-methyl pyrrolidone or butyrolactone and the oil is the preferred "flux oil" described above, a reboiler temperature of from 220 to 250° C. and a column pressure of from 50 to 200 millimeters is desirable.

What is claimed is:

1. A process for purifying a polymer containing solvent which has been used for purification of acetylene by absorption which comprises adding to said polymer containing solvent chosen from the group consisting of acetone, N-methyl pyrrolidone, butyrolactone, and dimethylformamide, a hydrocarbon oil miscible with said solvent, having an initial boiling point at least 125° C. higher than the boiling point of said solvent and inert to said solvent under the process conditions, said oil being added in an amount of from 1 to 15% by weight based on the combined weight of said oil and said solvent, distilling the resulting mixture of said polymer containing solvent and said oil at a temperature sufficient to vaporize said solvent and recovering the vaporized solvent substantially free of said polymer and said oil.

2. The process of claim 1 wherein said hydrocarbon oil is a distillation fraction from the hydrodealkylation oil, said fraction comprising compounds of $C_{13}$ and higher and having an initial boiling point of from about 300 to about 340° C. and a middle boiling point of from about 350 to 375° C.

3. The process of claim 2 wherein said distillation is carried out at a reboiler temperature of from 220 to about 250° C.

4. The process of claim 3 wherein the distillation is carried out at a column pressure of from about 50 to about 200 millimeters.

5. The process of claim 4 wherein the distillation is carried out at a reflux ratio of from about 1:3 to about 1:10.

(References on following page)

References Cited

UNITED STATES PATENTS

| | | | |
|---|---|---|---|
| 2,383,551 | 8/1945 | Isham | 203—52 |
| 2,470,206 | 5/1949 | Archiblad | 203—52 |
| 2,731,507 | 1/1956 | Akin | 55—64 |
| 2,884,359 | 4/1959 | Bloom et al. | 203—52 |
| 3,147,312 | 9/1964 | Johnson et al. | 260—678 |
| 3,324,011 | 6/1967 | Baum et al. | 203—52 |
| 3,360,443 | 11/1967 | Apotheker | 203—42 |

WILBUR L. BASCOMB, JR., *Primary Examiner.*

U.S. Cl. X.R.

55—64; 203—9, 57, 68, 69, 91; 260—678, 343.6, 326.5, 561, 593